United States Patent
He et al.

(10) Patent No.: US 9,967,296 B2
(45) Date of Patent: May 8, 2018

(54) METHOD AND APPARATUS FOR PLAYLIST SYNCHRONIZATION

(71) Applicant: Tencent Technology (Shenzhen) Company Limited, Shenzhen (CN)

(72) Inventors: Bo He, Shenzhen (CN); Wenwei Xin, Shenzhen (CN); Yilan Liu, Shenzhen (CN); Jinfang Yang, Shenzhen (CN); Xiaoyi Liao, Shenzhen (CN); Yijun Gao, Shenzhen (CN); Heng Zeng, Shenzhen (CN); Fengchun Li, Shenzhen (CN); Chuxiong Huang, Shenzhen (CN); Yang Guo, Shenzhen (CN); Jing Li, Shenzhen (CN); Yaoming Huang, Shenzhen (CN)

(73) Assignee: GUANGZHOU KUGOU COMPUTER TECHNOLOGY CO. LTD., Tianhe District, Guangzhou (CN)

( * ) Notice: Subject to any disclaimer, the term of this patent is extended or adjusted under 35 U.S.C. 154(b) by 224 days.

(21) Appl. No.: 14/703,568

(22) Filed: May 4, 2015

(65) Prior Publication Data
US 2015/0237078 A1 Aug. 20, 2015

Related U.S. Application Data

(63) Continuation of application No. PCT/CN2013/085691, filed on Oct. 22, 2013.

(30) Foreign Application Priority Data

Nov. 12, 2012 (CN) .......................... 2012 1 0450197

(51) Int. Cl.
*G06F 15/16* (2006.01)
*H04L 29/06* (2006.01)
*H04L 29/08* (2006.01)

(52) U.S. Cl.
CPC ...... *H04L 65/1083* (2013.01); *H04L 65/4092* (2013.01); *H04L 67/10* (2013.01)

(58) Field of Classification Search
CPC .. H04L 65/4092; H04L 65/1083; H04L 67/10
(Continued)

(56) References Cited

U.S. PATENT DOCUMENTS

2006/0080493 A1* 4/2006 Leon ................... G06F 11/1435
711/4
2006/0195479 A1* 8/2006 Spiegelman ...... G06F 17/30766
(Continued)

FOREIGN PATENT DOCUMENTS

CN 1914601 A 2/2007
CN 101017497 A 8/2007
(Continued)

OTHER PUBLICATIONS

Tencent Technology, IPRP, PCT/CN2013/085691, May 12, 2015, 9 pgs.
(Continued)

*Primary Examiner* — Thuong Nguyen
(74) *Attorney, Agent, or Firm* — Morgan, Lewis & Bockius LLP (57) ABSTRACT

The present application is applicable to the field of network technologies, and provides method and apparatus for playlist synchronization, where the method includes: detecting a user operation on a playlist of multimedia documents at a first terminal; generating an operation code according to the user operation on the playlist, the operation code including an identifier of the playlist; extracting identification information, the identification information including a user identifier and a globally unique identifier (GUID) of the first terminal; and sending the operation code and the identification information to the server, wherein the server is
(Continued)

configured to identify a second terminal according to the operation code and the identification information and send the operation code to the second terminal such that the second terminal can perform a synchronization operation to a playlist of multimedia documents at the second terminal according to the operation code.

13 Claims, 4 Drawing Sheets

(58) Field of Classification Search
USPC .............. 709/205, 206, 227; 707/634; 711/4
See application file for complete search history.

(56) References Cited

U.S. PATENT DOCUMENTS

| | | | | |
|---|---|---|---|---|
| 2007/0162605 | A1* | 7/2007 | Chalasani | ............... H04L 51/04 709/227 |
| 2012/0054793 | A1 | 3/2012 | Kang et al. | |
| 2012/0054808 | A1* | 3/2012 | Nijim | ............... H04N 21/47202 725/88 |
| 2012/0117026 | A1* | 5/2012 | Cassidy | ............ G06F 17/30053 707/634 |
| 2012/0143974 | A1* | 6/2012 | Zhang | ..................... H04L 51/04 709/206 |

FOREIGN PATENT DOCUMENTS

| | | |
|---|---|---|
| CN | 101340274 A | 1/2009 |
| CN | 102006319 A | 4/2011 |
| CN | 102215115 A | 10/2011 |
| CN | 102638703 A | 8/2012 |
| CN | 103096178 A * | 5/2013 |

OTHER PUBLICATIONS

Tencent Technology, ISRWO, PCT/CN2013/085691, Jan. 23, 2014, 11 pgs.

* cited by examiner

METHOD AND APPARATUS FOR PLAYLIST SYNCHRONIZATION

RELATED APPLICATIONS

This patent application is a continuation application of PCT Patent Application No. PCT/CN2013/085691, entitled "METHOD AND APPARATUS FOR PLAYLIST SYNCHRONIZATION" filed on Oct. 22, 2013, which claims priority to Chinese Patent Application No. 201210450197.X, filed with the Chinese Patent Office on Nov. 12, 2012 and entitled "METHOD AND APPARATUS FOR PLAYLIST SYNCHRONIZATION", both of which are incorporated herein by reference in their entirety.

FIELD OF THE TECHNOLOGY

The present application relates to the field of network technologies, and in particular, to method and apparatus for playlist synchronization.

BACKGROUND OF THE DISCLOSURE

With continuous improvement of an intelligent degree of terminals, a terminal used by a user to play digital multimedia files, such as music and videos, is not limited to only a computer any more, and the user may also choose various intelligent mobile terminals such as a mobile phone and a tablet computer according to an actual situation, to play the digital multimedia files.

When playing the digital multimedia files, the user usually creates a playlist suitable for the user, selects, according to personality and preference of the user, digital multimedia files to be played, and arranges a corresponding playback order. When a user creates a playlist on a client of one terminal, the user obviously hopes that this playlist can also be used to play the multimedia files on a client of another terminal. However, in an existing solution, when a user generates or changes a playlist on one client, the user needs to manually perform a playlist synchronization operation to another terminal to implement playlist synchronization. As a result, playlist synchronization cannot be automatically implemented in real time, and synchronization is delayed.

SUMMARY

One aspect of the present application provides a playlist synchronization method, which aims to solve problems in an existing technology that playlist synchronization among different terminals cannot be automatically implemented in real time, and synchronization is delayed.

According to one aspect of the present application, a method for synchronizing a playlist is performed between multiple terminals through a server is communicatively coupled to the multiple terminals via a communication network. The method includes: detecting a user operation on a playlist of multimedia documents at a first terminal; generating an operation code according to the user operation on the playlist, the operation code including an identifier of the playlist; extracting identification information, the identification information including a user identifier and a globally unique identifier (GUID) of the first terminal; and sending the operation code and the identification information to the server. The server is configured to identify a second terminal according to the operation code and the identification information and send the operation code to the second terminal such that the second terminal can perform a synchronization operation to a playlist of multimedia documents at the second terminal according to the operation code.

Another aspect of embodiments of the present application provides a server that is communicatively coupled to multiple terminals, the server including one or more processors, memory, and one or more program modules stored in the memory. The program modules, when executed by the one or more processors, cause the server to: receive an operation code and identification information from a first terminal, wherein the operation code is generated according to a user operation on a playlist of multimedia documents at the first terminal, the operation code including an identifier of the playlist, and the identification information includes a user identifier and a globally unique identifier (GUID) of the first terminal; identify a second terminal according to the operation code and the identification information; and send the operation code to the second terminal such that the second terminal can perform a synchronization operation to a playlist of multimedia documents at the second terminal according to the operation code.

Another aspect of the embodiments of the present application provides a method for synchronizing a playlist between multiple terminals through a server, wherein the multiple terminals are communicatively coupled to the server via a communication network, the method comprising: receiving an operation code from the server, wherein the operation code is generated by a first terminal according to a user operation on a playlist of multimedia documents at the first terminal and then sent to the server; and performing a synchronization operation to a playlist of multimedia documents at a second terminal according to the operation code. The operation code further includes an identifier of a multimedia document and a predefined action on the multimedia document and the synchronization operation performed by the second terminal further includes: searching for the multimedia document according to the identifier of the multimedia document; and when the multimedia document is found, applying the predefined action on the multimedia document; and when the multimedia document is not found, sending a request for the multimedia document to the server, receiving the multimedia document from a server-specified location, and applying the predefined action on the multimedia document.

In the embodiments of the present application, an operation code is generated according to an operation that is performed by a user on a playlist of multimedia documents at a terminal, and is uploaded to a server; and the server delivers the operation code to another terminal, so that while the playlist is changed, a playlist of multimedia documents on another terminal of the user is synchronously changed, thereby implementing automatic playlist synchronization, and improving the real-time quality of playlist synchronization.

DESCRIPTION OF EMBODIMENTS

To make objectives, technical solutions and advantages of the present application clearer and more understandable, the present application is further described in detail below with reference to the accompanying drawings and embodiments. It should be understood that the specific embodiments described herein are merely used for illustrating the present application, instead of limiting the present application.

In embodiments of the present application, an operation code is generated according to an operation that is performed by a user on a playlist of multimedia documents at a terminal, and then is uploaded to a server; and the server delivers the operation code to another terminal, so that while the playlist is changed, a playlist of multimedia documents on another terminal of the user is synchronously changed, thereby implementing automatic playlist synchronization, and improving the real-time quality of playlist synchronization.

Figure 1:
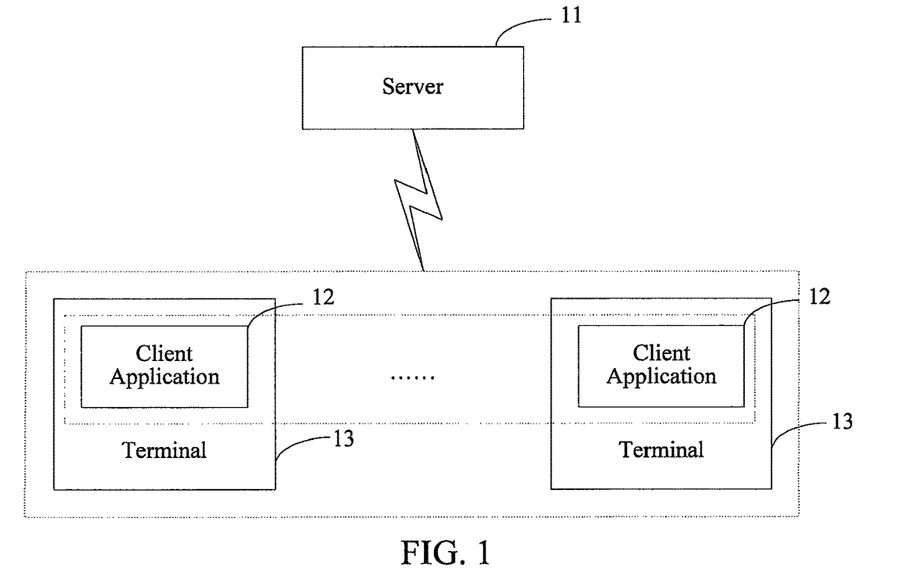
FIG. 1 exemplarily shows a structural diagram of a system to which a playlist synchronization method is applicable according to an embodiment of the present application.

FIG. 1 exemplarily shows a structural block diagram of a system to which a playlist synchronization method is applicable according to an embodiment of the present application. For ease of description, only parts related to this embodiment are shown.

Referring to FIG. 1, the system is formed by a server 11 and at least two client applications 12, where the server 11 communicates with each client application 12 via a communication network. In the system, different client applications 12 are respectively located on different terminals 13. The terminal 13 includes, but is not limited to, a terminal that can run the client application 12 and provide a network access function, such as a computer, a tablet computer, and a mobile phone, for providing a running environment for the client application 12, and ensuring communication between the client application 12 and server 11.

Preferably, in this embodiment, the server 11 may be a cloud server, thereby providing a stronger and securer data service for the client application 12.

In this embodiment of the present application, a user may create and maintain a same playlist on each client application 12, to play multimedia files according to personality and preference of the user. Preferably, the user may log into each client application 12 by using a same user account, and the client application 12 displays the corresponding playlist for the user according to the user account.

Figure 2:
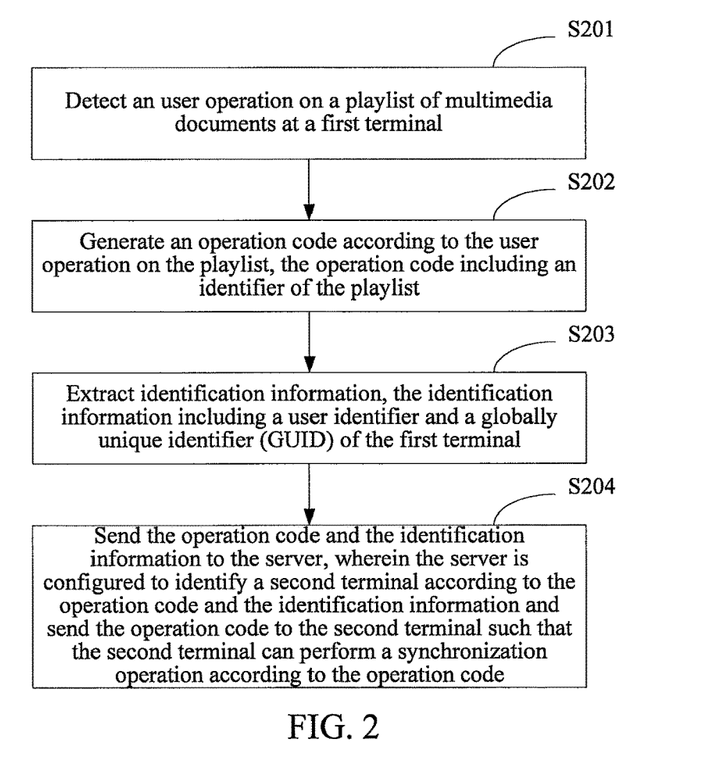
FIG. 2 exemplarily shows a flowchart of implementing a playlist synchronization method at a terminal according to an embodiment of the present application.

FIG. 2 exemplarily shows a flowchart of implementing a playlist synchronization method at a terminal according to an embodiment of the present application, which is described in detail as follows:

Referring to FIG. 2, step S201: detect a user operation on a playlist of multimedia documents at a first terminal.

In this embodiment, the first terminal may be, for example, one of the terminals 13 in the system shown in FIG. 1. The user may create and maintain, on the client application, a playlist of multimedia files the user needs to play, where the user operation on the playlist of the client application includes, but is not limited to, the following several operations:

1. Add a new track, which includes adding a multimedia file such as an audio and a video from local storage, or adding a link of a multimedia file by using an online playback function of the client application.

Usually, after a new track is added to a playlist, the newly added track may appear at the first position, the last position, or an insertion position specified by the user, of the playlist.

2. Delete a track: the user deletes one or multiple tracks from a created playlist.

3. Adjust a track sequence: the user adjusts a track sequence in an existing playlist, which usually includes that the user moves one or multiple tracks at the same time to a new position(s) in the playlist.

4. Create a playlist: the user may customize playlists that suit different personality and preference of the user better by creating one or more playlists on the same client.

5. Delete a playlist: the user selects one or more created playlists and deletes the one or more playlists.

In addition, the operation on the playlist may also include: renaming a playlist, renaming a track, adjusting a playlist sequence adjustment, and the like, which is not listed herein one by one.

Step S202: Generate an operation code according to the user operation on the playlist, the operation code including an identifier of the playlist.

In this embodiment, for any operation of the user on the playlist, an operation code corresponding to the operation may be generated by using a preset rule. By using the foregoing five operations of the user on the playlist as examples, the following operation codes may be respectively and correspondingly generated for the five operations.

1. For the operation of adding a new track: a corresponding operation code is $F(a, A)$, where F indicates an "adding" operation, a indicates a track name in a playlist, A indicates a playlist name, and $F(a, A)$ indicates that a new track a is added at a specified position in a playlist A.

2. For the operation of deleting a track: a corresponding operation code is $D(a, A)$, where D indicates a "deletion" operation, a indicates a track name in a playlist, A indicates a playlist name, and $D(a, A)$ indicates that a track a is deleted from a playlist A.

3. For the operation of adjusting a track sequence: a corresponding operation code is $O(a, b, A)$, where O indicates a "sequence adjustment" operation, a and b separately indicate track names in a playlist, A indicates a playlist name, and $O(a, b, A)$ indicates that a track a and a track b are swapped in position in a playlist A.

4. For the operation of creating a playlist: a corresponding operation code is $F(A)$, where F indicates an "adding" operation, and $F(A)$ indicates that a playlist named A is created.

5. For the operation of deleting a playlist: a corresponding operation code is $D(A)$, where D indicates a "deletion" operation, and $D(A)$ indicates that a playlist named A is deleted.

During a specific implementation, the operation codes generated for the forgoing operations may be not limited to the foregoing formats, and operation codes in corresponding formats may also be generated for other operations in addition to the foregoing operations according to a preset rule, which are not described one by one with examples herein.

Step S203: Extract identification information, the identification information including a user identifier or a GUID of the first terminal.

The identification information may be the user identifier, for example, a user name used by the user to log into the client application, and may also be the GUID of the first terminal, where a GUID is used for uniquely identifying a client application. In this embodiment, the identification information is used by a server to determine a second terminal that needs to synchronize a playlist with the first terminal, and the step of identifying the second terminal is described in detail in a subsequent embodiment, which is not described herein.

Step S204: Send the operation code and the identification information to the server, wherein the server is configured to identify a second terminal according to the operation code and the identification information and send the operation code to the second terminal such that the second terminal can perform a synchronization operation to a playlist of multimedia documents at the second terminal according to the operation code.

In this embodiment, the operation code and the identification information are sent to the server, and the server may identify, according to the identification information, the second terminal that performs playlist synchronization, so that the second terminal acquires the operation code, and performs the synchronization operation to the playlist of the second terminal according to an indication of the operation code, thereby implementing automatic and real-time playlist synchronization, where the second terminal may be, for example, another terminal 13 that synchronizes the playlist with the first terminal in the system shown in FIG. 1.

Figure 3:
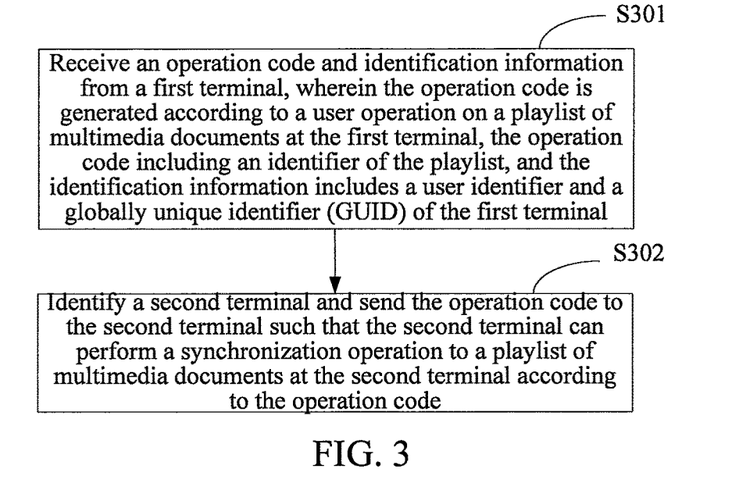
FIG. 3 exemplarily shows a flowchart of implementing a playlist synchronization method at the side of a server according to an embodiment of the present application.

FIG. 3 exemplarily shows a flowchart of implementing a playlist synchronization method at the side of a server according to an embodiment of the present application. In this embodiment, the process may be executed by the server 11 in the system shown in FIG. 1, which is described in detail as follows:

Step S301: Receive an operation code and identification information from a first terminal, wherein the operation code is generated according to a user operation on a playlist of multimedia documents at the first terminal, the operation code including an identifier of the playlist, and the identification information includes a user identifier and a GUID of the first terminal.

Step S302: Identify a second terminal and send the operation code to the second terminal such that the second terminal can perform a synchronization operation to a playlist of multimedia documents at the second terminal according to the operation code. In some embodiments, the server extracts the user identifier from the identification information and the identifier of the playlist from the operation code. Using the user identifier, the server identifies a plurality of terminals associated with the user identifier and then selects, among a plurality of terminals, the second terminal that matches the user identifier and the identifier of the playlist. Based on the identification result, the server returns an acknowledgement message to the first terminal, the acknowledgement message including a GUID of the second terminal.

According to an embodiment of the present application, when the identification information includes the user identification of the user, the server determines, according to the user identifier, the second terminal to which the user currently logs into his account using the user identifier to enter an online state. Specifically, when the user logs into the client application using a dedicated account, the server may acquire an online condition of the same user account on different terminals, and determine a terminal, to which the user currently logs in using a user identifier the same as that on the first terminal to enter an online state, as the second terminal.

Figure 4:
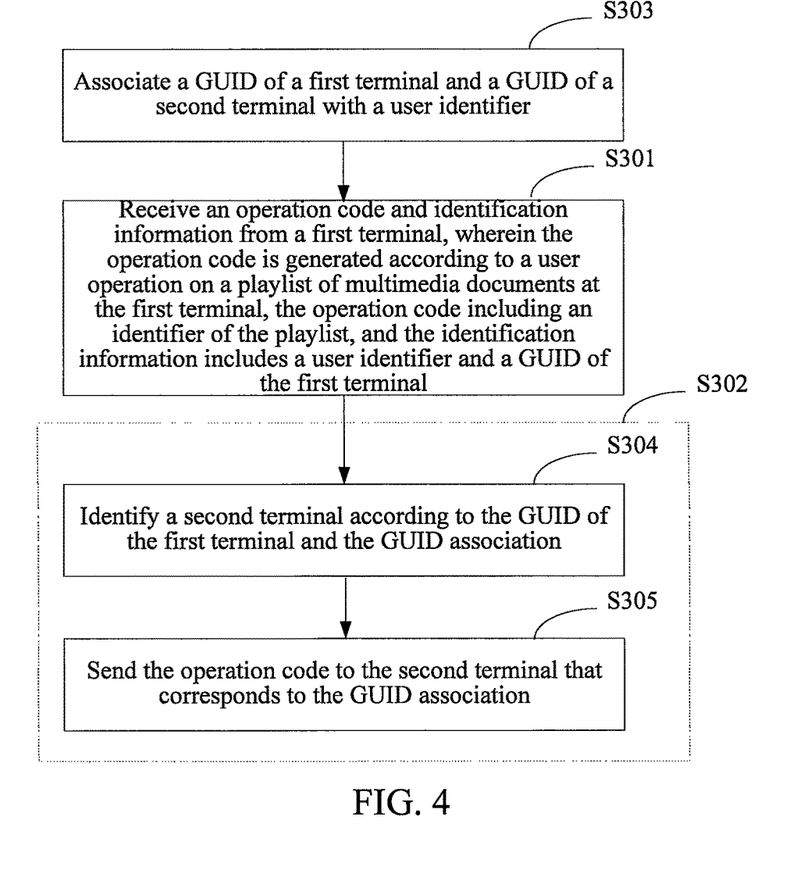
FIG. 4 exemplarily shows a flowchart of implementing a playlist synchronization method at the side of a server according to another embodiment of the present application.

According to another embodiment of the present application, when the identification information includes the GUID of the first terminal, a process of implementing the playlist synchronization method at the side of a server is shown in FIG. 4. In addition to step S301 and step S302 shown in FIG. 3, before step S301, the method further includes:

Step S303: Associate the GUID of the first terminal and the GUID of the second terminal with a user identifier.

In this embodiment, because each client application has a unique GUID, an association between the first terminal and each of multiple second terminals may be established by means of association of GUIDs and a corresponding user identifier. Specifically, the server may establish the association relationship between the first terminal and the second terminal by using a user configuration. In this way, the user does not need to log into the client, the server may also establish an association relationship between multiple terminals by using the user configuration, and the terminals that have an association relationship with each other may implement automatic and real-time playlist synchronization.

In addition, in this case, step S302 specifically includes:

Step S304: Identify a second terminal according to the GUID of the first terminal and the GUID association.

Step S305: Send the operation code to the second terminal that corresponds to the GUID association.

In this way, after receiving the operation code sent by the server, the second terminal may perform the synchronization operation to same playlists.

Figure 5:
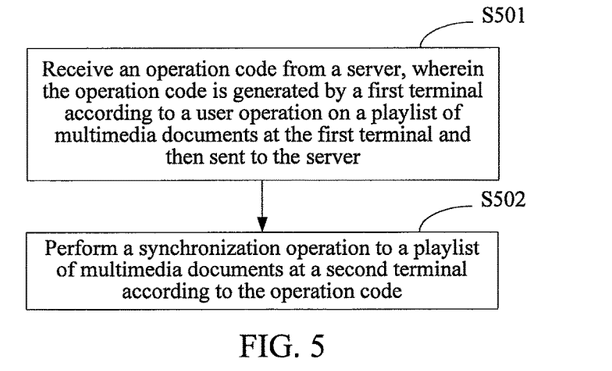
FIG. 5 exemplarily shows a flowchart of implementing a playlist synchronization method at a terminal according to another embodiment of the present application.

FIG. 5 exemplarily shows a flowchart of implementing a playlist synchronization method at a terminal according to another embodiment of the present application. In this embodiment, the process may be executed by, for example, another terminal 12 that needs to perform playlist synchronization with the one client application 12 in the system shown in FIG. 1, which is described in detail as follows:

Step S501: Receive an operation code from a server, wherein the operation code is generated by a first terminal according to a user operation on a playlist of multimedia documents at the first terminal and then sent to the server.

Step S502: Perform a synchronization operation to a playlist of multimedia documents at a second terminal according to the operation code.

In this embodiment, according to a preset format, after receiving the operation code, the client application may perform an operation, same as that on the first terminal, on the playlist, so as to implement playlist synchronization.

In some embodiments, the second terminal may be a client to which the user currently logs in by using a user identifier the same as that on the first terminal to enter an online state.

In some embodiments, the second terminal may be a client that corresponds to a GUID associated with a GUID of the first terminal.

In some embodiments, the operation code further includes an identifier of a multimedia document and a predefined action on the multimedia document. The synchronization operation performed by the second terminal further includes searching for the multimedia document according to the identifier of the multimedia document. When the multimedia document is found, the second terminal applies the predefined action on the multimedia document; when the multimedia document is not found, the second terminal sends a request for the multimedia document to the server, receives the multimedia document from a server-specified location (e.g., the first terminal), and applies the predefined action on the multimedia document.

In some embodiments, the operation code further includes a progress timestamp of a multimedia document indicating at what point in time the play of the multimedia document is suspended on the first terminal. Upon receipt of the progress timestamp, the second terminal performs the synchronization operation by playing the multimedia document starting at the progressive timestamp in response to a user selection of the multimedia document. In some embodiments, the second terminal may roll back the play of the multimedia document by a predefined amount and then start playing the multimedia document.

Further, while performing a synchronization operation to the playlist according to the operation code, the second terminal may further dynamically display the synchronization operation to the playlist of the second terminal according to a different operation type, so as to bring a more intuitive playlist synchronization experience to the user.

Figure 6:
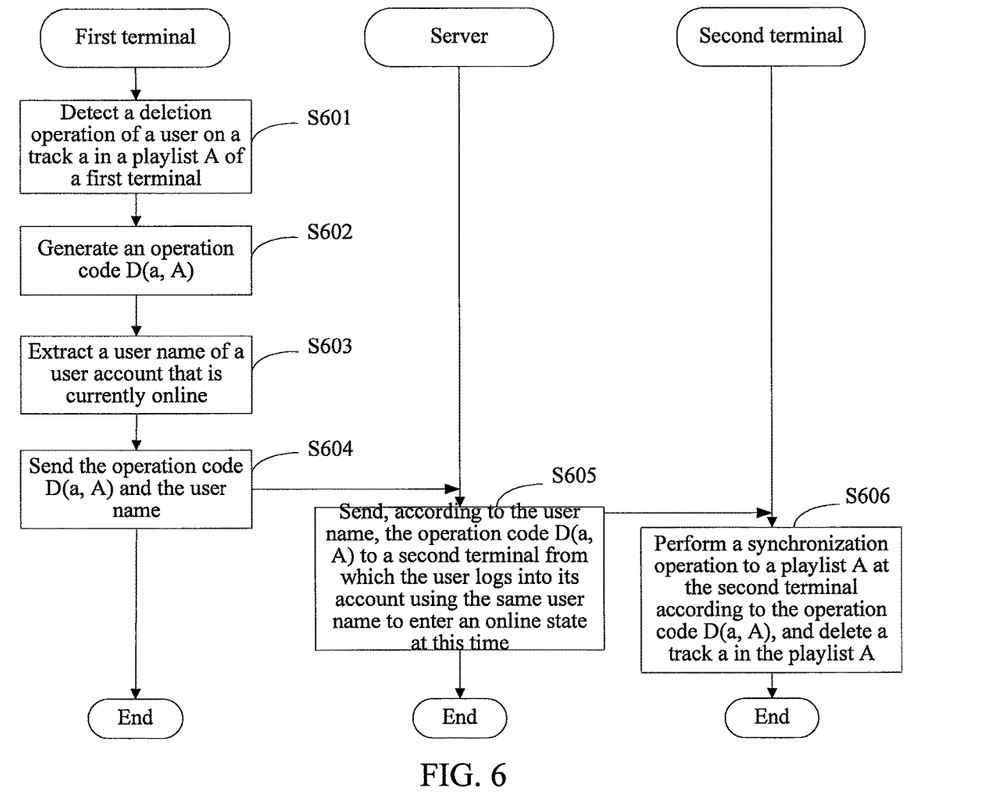
FIG. 6 exemplarily shows an interaction flowchart of a playlist synchronization method according to an embodiment of the present application by using a specific application scenario as an example.

FIG. 6 exemplarily shows an interaction flowchart of a playlist synchronization method according to an embodiment of the present application by using a specific application scenario as an example. In the application scenario shown in FIG. 6, after logging in to, by using an account of the user, a player (a first terminal) running on a computer, a user further logs, by using the same account, in to the player (a second terminal) running on a mobile phone. In this case, the accounts on the first terminal and the second terminal are simultaneously online. In this application scenario, by using an example in which the user deletes a track in a playlist on the computer, a process of implementing synchronization of a playlist on the mobile phone is as follows:

Step S601: The first terminal detects a deletion operation of the user on a track a in a playlist A of the first terminal.

Step S602: The first terminal generates an operation code D(a, A).

Step S603: The first terminal extracts a user name of a user account that is currently online.

Step S604: The first terminal sends the operation code D(a, A) and a user name to a server.

Step S605: The server sends, according to the user name, the operation code D(a, A) to the second terminal to which the user logs in by using the same user name to enter an online state at this time.

Step S606: The second terminal performs a synchronization operation to a playlist A of the second terminal according to the operation code D(a, A), and deletes the track a in the playlist A.

In this way, while the user deletes the track a in the playlist A of the first terminal, the server transmits the corresponding operation code, so that the second terminal can automatically delete the track a in the playlist A of the second terminal, thereby implementing instant and automatic synchronization of the same playlists on multiple terminals, and improving the real-time quality of playlist synchronization.

In this embodiment of the present application, an operation code is generated according to an operation that is performed by a user on a playlist of multimedia documents at a terminal, and then is uploaded to a server; and the server delivers the operation code to another terminal, so that while the playlist is changed, a playlist of multimedia documents on another terminal of the user is synchronously changed, thereby implementing automatic playlist synchronization, and improving the real-time quality of playlist synchronization.

Figure 7:
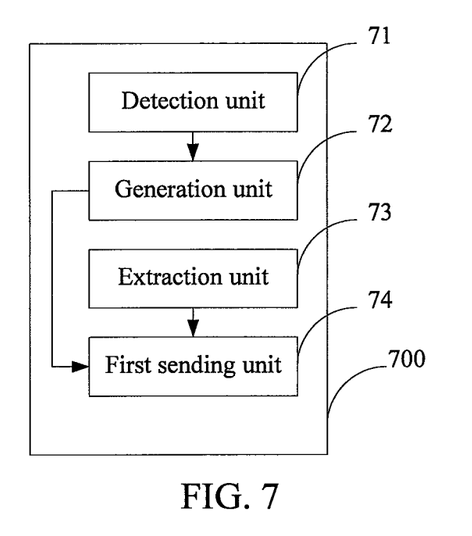
FIG. 7 to FIG. 9 exemplarily show structural block diagrams of a playlist synchronization apparatus according to an embodiment of the present application.
Figure 8:
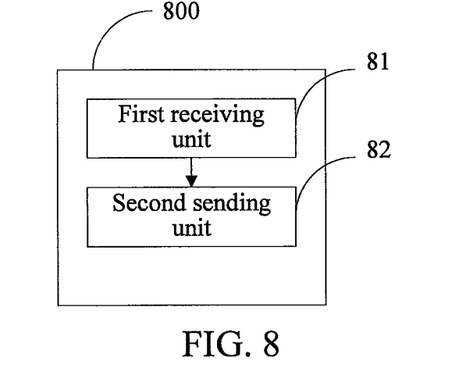
Figure 9:
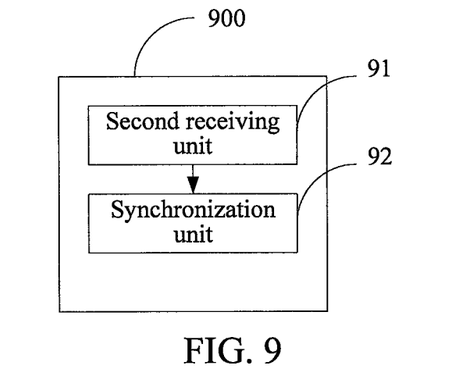

FIG. 7 to FIG. 9 exemplarily show structural block diagrams of a playlist synchronization apparatus according to an embodiment of the present application. The apparatus may be separately located on the server 11 and the client application 12 shown in the embodiment of FIG. 1, for running the playlist synchronization methods shown in FIG. 1 to FIG. 6 of the present application. For ease of description, only parts related to this embodiment are shown.

Referring to FIG. 7, a playlist synchronization apparatus 700 applied to a client includes: a detection unit 71, configured to detect a user operation on a playlist of multimedia documents at a first terminal; a generation unit 72, configured to generate an operation code according to the user operation on the playlist, the operation code including an identifier of the playlist; an extraction unit 73, configured to identification information, the identification information including a user identifier and a GUID of the first terminal; and a first sending unit 74, configured to sending the operation code and the identification information to the server, wherein the server is configured to identify a second terminal according to the operation code and the identification information and send the operation code to the second terminal such that the second terminal can perform a synchronization operation to a playlist of multimedia documents at the second terminal according to the operation code.

Referring to FIG. 8, a playlist synchronization apparatus 800 applied to a server includes: a first receiving unit 81, configured to receive an operation code and identification information from a first terminal, wherein the operation code is generated according to a user operation on a playlist of multimedia documents at the first terminal, the operation code including an identifier of the playlist, and the identification information includes a user identifier and a globally unique identifier (GUID) of the first terminal; and a second sending unit 82, configured to identify a second terminal according to the operation code and the identification information and send the operation code to a second terminal according to the identification information, so that the second terminal performs a synchronization operation to a playlist of the second terminal according to the operation code.

In some embodiments, when the identification information includes the user identifier, the second sending unit 82 includes: a determining subunit (not shown), configured to determine, according to the user identifier, the second terminal to which the user currently logs in by using the user identifier to enter an online state; and a first sending subunit (not shown), configured to send the operation code to the second terminal to which the user currently logs in by using the user identifier to enter an online state.

In some embodiments, when the identification information includes the GUID of the first terminal, the playlist synchronization apparatus 800 further includes: an association unit (not shown), configured to associate the GUID of the first terminal with a GUID of the second terminal.

The second sending unit 82 includes: an acquisition subunit (not shown), configured to acquire, according to the GUID of the first terminal, the GUID associated with the GUID of the first terminal; and a second sending subunit (not shown), configured to send the operation code to the second terminal that corresponds to the GUID associated with the GUID of the first terminal.

Referring to FIG. 9, a playlist synchronization apparatus 900 applied to a client application includes: a second receiving unit 91, configured to receive an operation code sent by a server, the operation code being generated according to an operation, which is detected by a first terminal, of a user on a playlist of the first terminal; and a synchronization unit 92, configured to perform a synchronization operation to a playlist of a second terminal according to the operation code.

In some embodiments, the second terminal includes a client to which the user currently logs in by using the user identifier to enter an online state.

In some embodiments, the second terminal includes a client that corresponds to a GUID associated with a GUID of the first terminal.

In this embodiment of the present application, an operation code is generated according to an operation that is performed by a user on a playlist of multimedia documents at a terminal, and then is uploaded to a server; and the server delivers the operation code to another terminal, so that while the playlist is changed, a playlist of multimedia documents on another terminal of the user is synchronously changed, thereby implementing automatic playlist synchronization, and improving the real-time quality of playlist synchronization.

Elements of the present application, such as the detection unit, the generation unit, the extraction unit, the sending unit, the receiving unit, the determining unit, the association unit, and the acquisition unit may be implemented as hardware, software, and firmware, or a combination thereof, and may be used in systems, subsystems, components, or subcomponents thereof, to implement the playlist synchronization method of the present application. When being implemented by the software, the foregoing elements of the present application are programs or code segments that are used for executing required tasks. The programs or the code segments may be stored in a machine readable medium of a computer apparatus (such as a client), or are transferred on a transmission medium or a communication link by using a digital signal carried in a carrier. The "machine readable medium" may include any medium that can store or transmit information. Examples of the machine readable medium include an electronic circuit, a semiconductor storage device, a read-only memory (ROM), a flash memory, an erasable ROM (EROM), a floppy disk, a compact disc read-only memory (CD-ROM), an optical disc, a hard disk, an optical fiber medium, a radio frequency (RF) link, and the like. The code segment may be downloaded via a computer network such as the Internet and an intranet.

The foregoing descriptions are merely exemplary embodiments of the present application, but are not intended to limit the present application. Any modification, equivalent replacement, and improvement made without departing from the spirit and principle of the present application shall fall within the protection scope of the present application.

What is claimed is:

1. A method for synchronizing a playlist between multiple mobile terminals through a server, wherein the multiple mobile terminals are communicatively coupled to the server via a communication network, the method comprising:
   detecting a user update operation on a playlist of multimedia documents associated with a user account at a first mobile terminal;
   generating an update operation code according to the user update operation on the playlist, the update operation code including (1) an identifier of the playlist, and (2) a progress timestamp of a multimedia document in the playlist indicating at what time point the play of the multimedia document is suspended at the first mobile terminal;
   extracting identification information, the identification information including a user identifier of the user account and a globally unique identifier (GUID) of the first mobile terminal;
   determining a second mobile terminal that has logged into the user account using the same user identifier and is currently in an online state and has a GUID different from the GUID of the first mobile terminal;
   sending the update operation code and the identification information to the server, wherein the server is configured to send the update operation code to the second mobile terminal according to the identification information such that the second mobile terminal can perform a synchronization operation to the playlist of multimedia documents at the second mobile terminal according to the update operation code, wherein the synchronization operation performed by the second mobile terminal includes playing, in response to a user selection of the multimedia document, the multimedia document starting at a time point rolled back by a predetermined time period before the progress timestamp indicating the time point the play of the multimedia document was suspended at the first mobile terminal.

2. The method according to claim 1, wherein the server is further configured to:
   extract the user identifier from the identification information;
   extract the identifier of the playlist from the update operation code;
   select, among a plurality of mobile terminals, the second mobile terminal that matches the user identifier and the identifier of the playlist; and
   return an acknowledgement message to the first mobile terminal, the acknowledgement message including the GUID of the second mobile terminal.

3. The method according to claim 2, wherein the second mobile terminal is registered as being in an online state at the server simultaneously while the first mobile terminal is registered as being in an online state at the server.

4. The method according to claim 2, wherein the server is configured to associate the GUID of the first mobile terminal and the GUID of the second mobile terminal with the user identifier before receiving the update operation code and the identification information from the first mobile terminal.

5. The method according to claim 1, wherein the update operation code further includes an identifier of a multimedia document and information associated with a predefined action on the multimedia document, and the synchronization operation performed by the second mobile terminal further includes:
   searching for the multimedia document according to the identifier of the multimedia document; and
   when the multimedia document is found, applying the predefined action on the multimedia document; and
   when the multimedia document is not found,
      sending a request for the multimedia document to the server, receiving the multimedia document from a server-specified location, and applying the predefined action on the multimedia document.

6. The method according to claim 5, wherein the server-specified location is the first mobile terminal.

7. A server that is communicatively coupled to multiple mobile terminals, the server comprising:

one or more processors;
memory; and
one or more program modules stored in the memory, wherein the one or more program modules, when executed by the one or more processors, cause the server to:
receive an update operation code and identification information from a first mobile terminal, wherein the update operation code is generated according to a user update operation on a playlist of multimedia documents associated with a user account at the first mobile terminal, the update operation code including (1) an identifier of the playlist and (2) a progress timestamp of a multimedia document in the playlist indicating at what time point the play of the multimedia document is suspended at the first mobile terminal, and wherein the identification information includes a user identifier of the user account and a globally unique identifier (GUID) of the first mobile terminal;
identify a second mobile terminal that has logged into the user account using the same user identifier and is currently in an online state and has a GUID different from the GUID of the first mobile terminal according to the update operation code and the identification information; and
send the update operation code to the second mobile terminal according to the GUID of the second mobile terminal such that the second mobile terminal can perform a synchronization operation to the playlist of multimedia documents at the second mobile terminal according to the update operation code, wherein the synchronization operation performed by the second mobile terminal includes playing, in response to a user selection of the multimedia document, the multimedia document starting at a time point rolled back by a predetermined time period before the progress timestamp indicating the time point the play of the multimedia document was suspended at the first mobile terminal.

8. The server according to claim 7, wherein the server is further configured to:
extract the user identifier from the identification information;
extract the identifier of the playlist from the update operation code;
select, among a plurality of mobile terminals, the second mobile terminal that matches the user identifier and the identifier of the playlist; and
return an acknowledgement message to the first mobile terminal, the acknowledgement message including a GUID of the second mobile terminal.

9. The server according to claim 8, wherein the second mobile terminal is registered as being in an online state at the server simultaneously while the first mobile terminal is registered as being in an online state at the server.

10. The server according to claim 8, wherein the server is further configured to associate the GUID of the first mobile terminal and the GUID of the second mobile terminal with the user identifier before receiving the update operation code and the identification information from the first mobile terminal.

11. A method for synchronizing a playlist between multiple mobile terminals through a server, wherein the multiple mobile terminals are communicatively coupled to the server via a communication network, the method comprising:
receiving, at a second mobile terminal, an update operation code from the server, wherein the update operation code is generated by a first mobile terminal according to a user update operation on a playlist of multimedia documents at the first mobile terminal and then sent to the server, wherein the update operation code includes a progress timestamp of a multimedia document in the playlist indicating at what time point the play of the multimedia document is suspended at the first mobile terminal, wherein the first mobile terminal and the second mobile terminal, each having a globally unique identifier (GUID), have logged into a user account at the server using a same user identifier and are both registered as being in an online state at the server simultaneously before the update operation code is generated; and
performing a synchronization operation to the playlist of multimedia documents at the second mobile terminal according to the update operation code, comprising:
playing, in response to a user selection of the multimedia document, the multimedia document starting at a time point rolled back by a predetermined time period before the progress timestamp indicating the time point the play of the multimedia document was suspended at the first mobile terminal,
wherein the update operation code further includes an identifier of the multimedia document and information associated with a predefined action on the multimedia document, and the synchronization operation performed by the second mobile terminal further includes:
searching for the multimedia document according to the identifier of the multimedia document; and
when the multimedia document is found, applying the predefined action on the multimedia document; and
when the multimedia document is not found,
sending a request for the multimedia document to the server, receiving the multimedia document from a server-specified location, and applying the predefined action on the multimedia document.

12. The method according to claim 11, wherein the update operation code further includes an identifier of a multimedia document and a predefined action on the multimedia document, and the synchronization operation performed by the second mobile terminal further includes:
searching for the multimedia document according to the identifier of the multimedia document; and
when the multimedia document is found, applying the predefined action on the multimedia document; and
when the multimedia document is not found:
sending a request for the multimedia document to the server, receiving the multimedia document from a server-specified location, and applying the predefined action on the multimedia document.

13. The method according to claim 12, wherein the server-specified location is the first mobile terminal.

* * * * *